United States Patent [19]

Hanai et al.

[11] Patent Number: 4,913,482
[45] Date of Patent: Apr. 3, 1990

[54] SEAT SUSPENSION SYSTEM FOR AUTOMOTIVE VEHICLE OR THE LIKE

[75] Inventors: Toshimichi Hanai, Yokosuka; Ken Kamijo, Zushi, both of Japan

[73] Assignee: Mitsubishi Denki Kabushiki Kaisha, Japan

[21] Appl. No.: 912,801

[22] Filed: Sep. 29, 1986

[30] Foreign Application Priority Data

Sep. 30, 1985 [JP] Japan ................................ 60-215127
Sep. 30, 1985 [JP] Japan ................................ 60-215128
Sep. 30, 1985 [JP] Japan ........................... 60-148031[U]

[51] Int. Cl.$^4$ ............................................. B60N 1/02
[52] U.S. Cl. ................................. 296/65.1; 297/345; 280/707; 248/421; 248/550; 248/566
[58] Field of Search ................ 296/65 R; 297/345; 280/707; 248/421, 550, 566, 588; 180/89.13, 89.14; 188/299, 319

[56] References Cited

U.S. PATENT DOCUMENTS

| | | | |
|---|---|---|---|
| 3,632,077 | 1/1972 | Hall et al. | 297/345 |
| 3,954,245 | 5/1976 | Costin | 297/345 |
| 4,309,015 | 1/1982 | Muhr | 297/330 X |
| 4,313,529 | 2/1982 | Kato et al. | 188/319 X |
| 4,384,700 | 5/1983 | Thompson et al. | 248/550 |
| 4,573,657 | 3/1986 | Sakamoto | 248/421 X |
| 4,589,620 | 5/1986 | Sakamoto | 248/588 X |
| 4,640,488 | 2/1987 | Sakamoto | 248/588 |
| 4,645,042 | 2/1987 | Inoue et al. | 280/707 X |
| 4,648,622 | 3/1987 | Wada et al. | 280/707 |
| 4,655,440 | 4/1987 | Eckert | 188/299 X |
| 4,657,280 | 4/1987 | Ohmori | 280/707 |
| 4,664,409 | 5/1987 | Nakashima et al. | 280/707 |

FOREIGN PATENT DOCUMENTS

| | | | |
|---|---|---|---|
| 135902 | 4/1985 | European Pat. Off. | 280/707 |
| 157181 | 10/1985 | European Pat. Off. | 280/707 |
| 40579 | 10/1976 | Japan . | |
| 1230734 | 5/1971 | United Kingdom . | |
| 1394622 | 5/1975 | United Kingdom | 296/65 R |

Primary Examiner—Dennis H. Pedder
Attorney, Agent, or Firm—Leydig, Voit & Mayer

[57] ABSTRACT

A seat suspension includes a device which is responsive to a sensor which detects the condition of the road surface being traversed by the vehicle in a manner to produce relatively hard suspension characteristics when the vehicle is running on a rough road and softer characteristics when traversing a road having a smooth surface. The suspension of the vehicle if equipped with variable hardness type shock absorbers can be controlled in parallel with the seat suspension to improve the ride. Additional sensors which sense parameters such as acceleration, braking, steering angle, vehicle speed etc., can be used to control the setting of the seat suspension in addition to the basic road condition control.

14 Claims, 16 Drawing Sheets

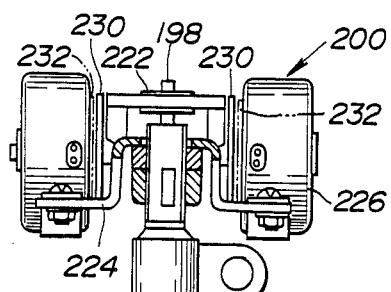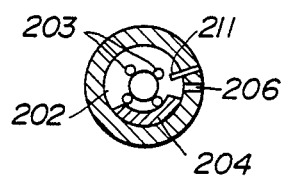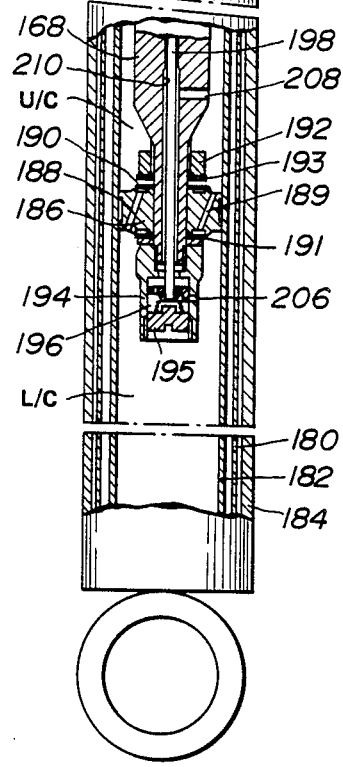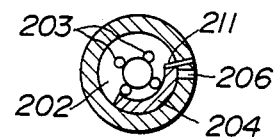

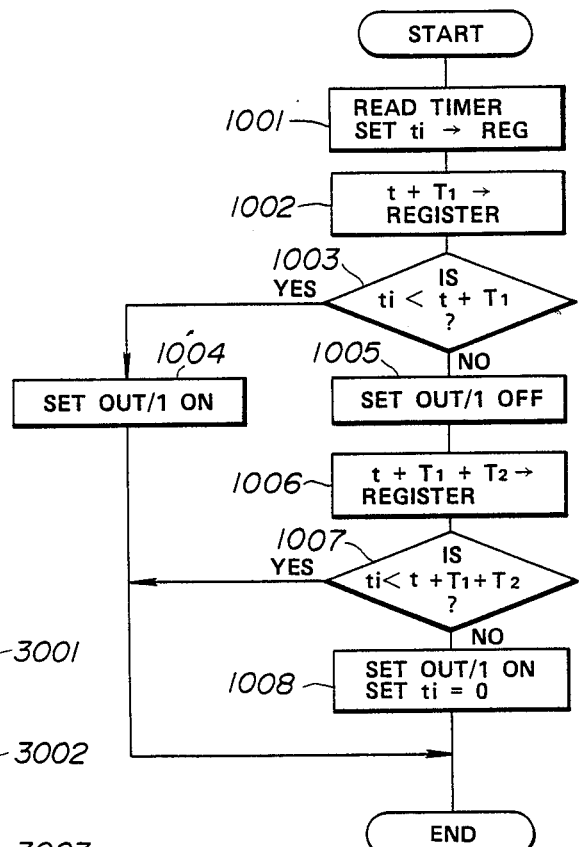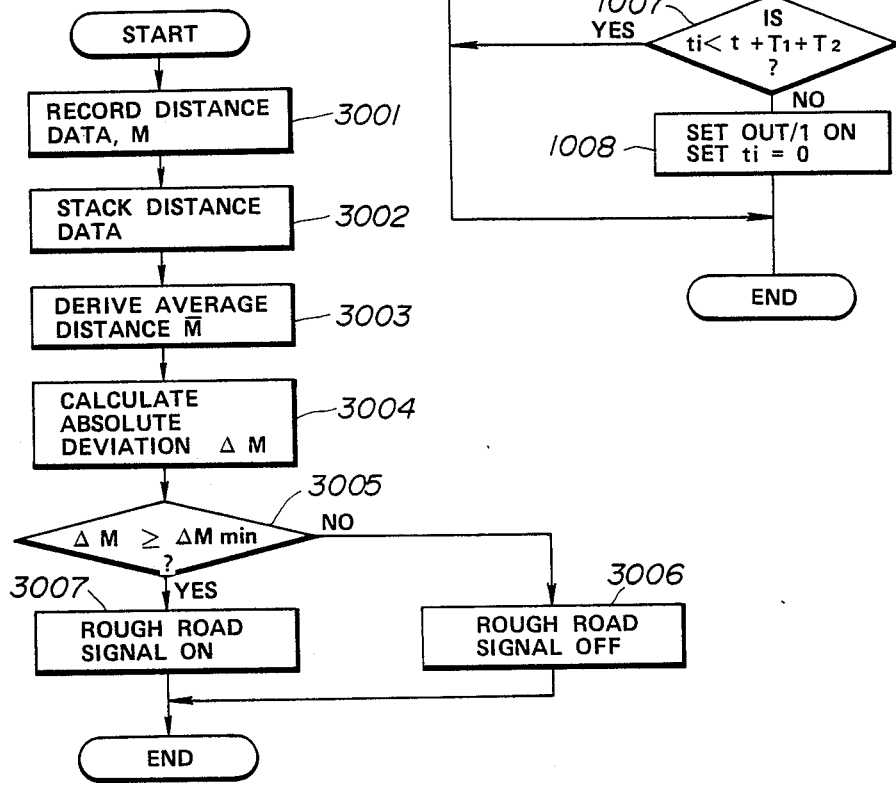

SEAT SUSPENSION SYSTEM FOR AUTOMOTIVE VEHICLE OR THE LIKE

BACKGROUND OF THE INVENTION

1. Field of the Invention

The present invention relates generally to a vehicle seat and more specifically to a suspension arrangement for a vehicle seat the hardness characteristics of which can be automatically adjusted in accordance with road conditions, vehicle operational parameters and the like.

2. Description of the Prior Art

FIGS. 1 and 2 shows a previously proposed suspension arrangement used to support a seat in a vehicle cabin or the like. This arrangement is disclosed in detail in British patent specification No. 1,230,734. As shown, a pair of springs 2,2 and a pair of dampers 4, 4 are disposed in a seat frame which is arranged essentially horizontally with respect ot a frame or base. One end of each of the springs 2, 2 and dampers 4, 4 is secured to a transverse connecting member 6 which extends between two pair of scissor levers 8. The other ends of the dampers 4, 4 are connected to the seat frame 10 while the other ends of the springs 2, 2 are connected with a lever arrangement 12 which permits the tension in the springs to be adjusted. This arrangement, while permitting a very compact construction which can be readily applied to a reclining seats, has suffered from the drawback that as the springs 2, 2 and the dampers 4, 4 are operatively interconnected in a manner which permits the same to act directly against one another, the damping period of the system tends to be excessively long thus permitting the seat to oscillate up and down in a manner which imparts a disturbingly unstable sensation to the occupant. Also, the arrangement cannot be adjusted in a manner which selectively varies the hardness of seat suspension characteristics.

SUMMARY OF THE INVENTION

It is an object to provide a compact seat suspension system which exhibits a very short damping period and which can automatically harden or soften the seat suspension characteristics.

It is a further object of the present invention to provide a suspension system wherein the seat suspension characteristics can be automatically varied in response to vehicle operation and or road surface conditions.

In its broadest sense the present invention takes the form of a seat control system for a vehicle which has a chassis and which is characterized by: a first sensor for sensing the condition of the road on which the vehicle is running and for issuing a signal indicative of whether the surface of the road is smooth or rough; and a suspension operatively interconnecting the seat and the chassis, the suspension including means for varying the resiliency of the suspension in response to the signal issued by the first sensor and for varying a bias applied to structural members in response to a manually generated signal to vary the height of the seat above the chassis.

BRIEF DESCRIPTION OF THE DRAWINGS

FIG. 8 is a partially sectioned elevation of a hydraulic shock absorber or damper unit utilized in the embodiments of the present invention;

FIGS. 9 and 10 show in sectional plan view a valve element which forms a vital part of the damper hardness control mechanism in first and second operative positions respectively;

FIGS. 15 and 18 are flow charts which show the steps which characterize the control of the first embodiment;

DETAILED DESCRIPTION OF THE PREFERRED EMBODIMENTS

Figure 1:
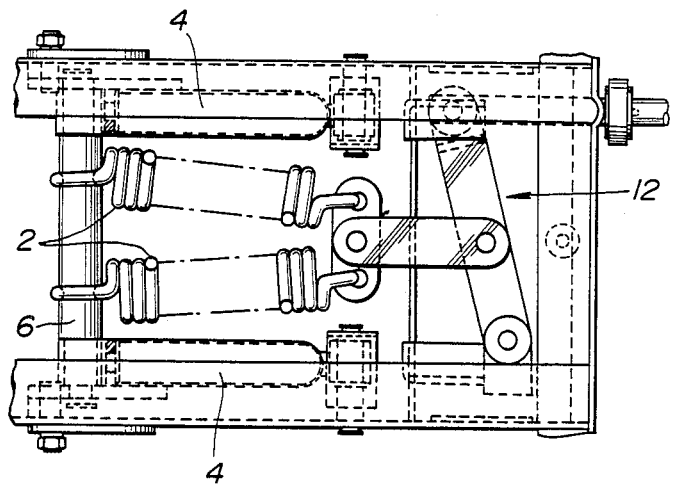
FIGS. 1 and 2 of the drawings show the prior art arrangement discussed in the opening paragraphs of the instant disclosure.
Figure 2:
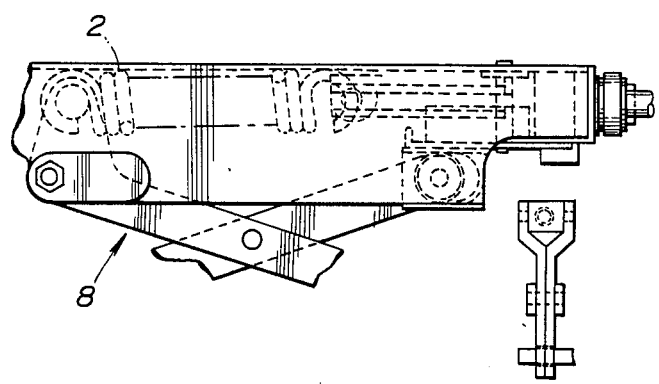
Figure 3:
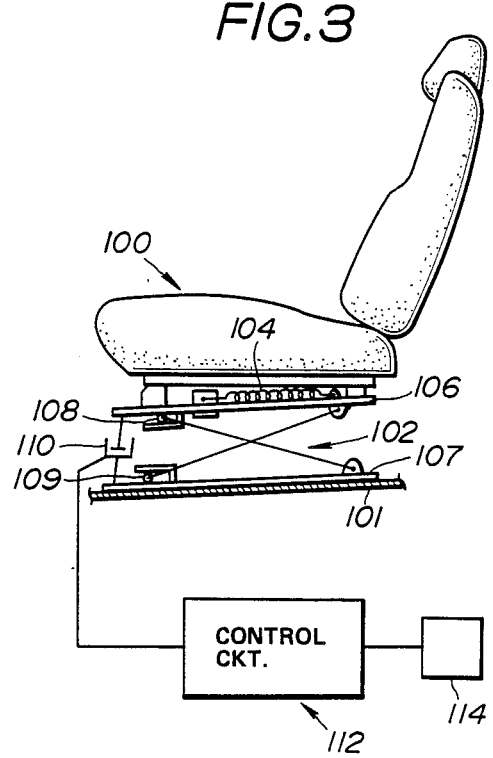
FIG. 3 is a schematic elevation of basic seat suspension arrangement which characterizes the present invention.

FIG. 3 shows in schematic form the basic arrangement of the seat suspension according to the first to third embodiments of the present invention. In this arrangement a seat 100 is resiliently supported on a vehicle floor or chassis by suspension unit which includes two pairs of scissor arms generally denoted by the numberal 102. Springs 104 are operatively interconnected between an upper base plate 106 upon which the seat proper 100 is mounted and to upper ends of the rearwardly extending legs of each of the scissor arm arrangements. The numberal 107 denotes the lower base plate of the suspension unit.

The tension in springs 104 control the amount by which the upper ends of the scissor arm arrangement are drawn together and therefore the height of the seat 100 above the vehicle floor (chassis 101).

The forward ends of the arms 102 are provided with rollers 108, 109 or similar sliding arrangements to permit the smooth raising and lowering of the seat.

To overcome the excessive damping period problem encountered with the prior art a single shock absorber or damper device 110 is connected directly between the upper base plate 106 and the floor or chassis 101 of the vehicle. According to the first to the third embodiments of the present invention this damper 110 is arranged to be adjustable and to be able to provide at least a "hard" and a "soft" setting which enables the resiliency characteristics of the suspension arrangement to be selectively variable. The present further provides a control circuit arrangement generally denoted by the number 112 which is basically responsive to the output of a sensor 114 which detects the condition of the road surface and which distinguishes between rough or poor road surfaces and smooth or good road surfaces and issues a signal indicative of the same. In the embodiments disclosed below, this sensor takes the form of an "radar" type arrangement which, in this case, emits ultrasonic radiation. However this sensor may consist of various other arrangements such as potentiometers or the like which are operatively connected with the vehicle suspension to detect the degree to which the structural members of the suspension are being displaced. That various types of sensors can be applied in the instant invention will be obvious to those skilled in the art.

When a vehicle is traversing a smooth road or surface the present invention sets the damper mechanism which is interconnected between the seat frame and the vehicle floor to a "soft" setting so as to permit the suspension arrangement to absorb the slight road shocks and the like which are apt to be transmitted to the occupant via the seat. However, when transversing a rough surface wherein the vehicle is apt to jolt and/or bounce up and down, in order to hold the occupant in a firmer more stable condition under such modes of operation, the present invention sets the damper mechanism 110 to "hard" and thus resists the tendency for the seat to move up and down with respect to the vehicle floor in a manner which imparts an unstable sensation on the occupant.

Figure 4:
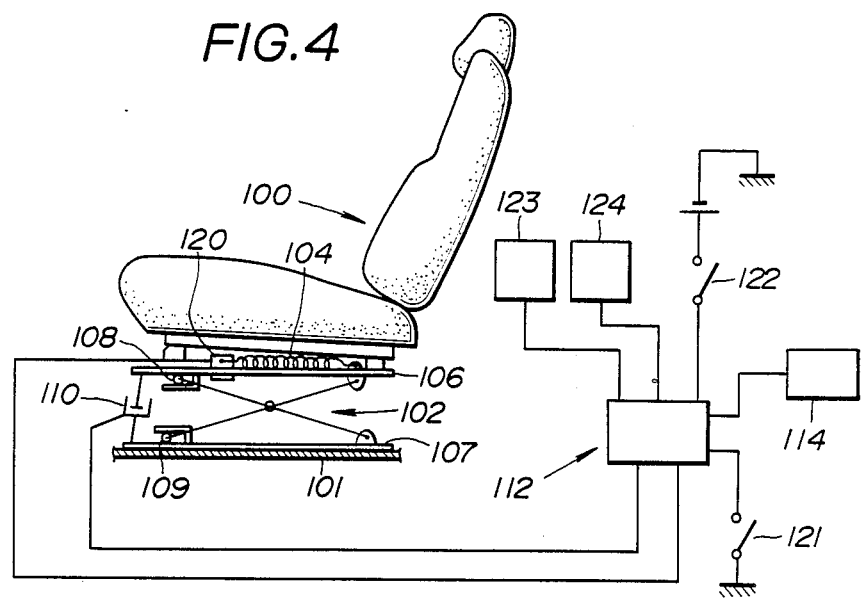
FIG. 4 is a schematic elevation similar to that of FIG. 3 which shows a first embodiment of the present invention.

FIG. 4 shows a first embodiment of the present invention. This embodiment, as shown, includes a motor 120 which is operatively connected to the springs 104 in a manner which permits the height of the seat to be selectively increased or decreased by increasing or decreasing the tension in the springs 104.

In this embodiment, the operation of the motor 120 and the setting of the damper mechanism 110 is controlled by control circuit 112. This circuit receives inputs from the road condition sensor 114; a door switch (or switches) 121 which detects the closure of the vehicle door (or doors); the ignition switch 122 of the vehicle engine or corresponding prime mover control switch; a manually operable seat height control switch 123 via which the seat can be selectively raised and lowered; and a manual mode control switch 124 which can be set to automatic, hard or soft position.

Figure 5:
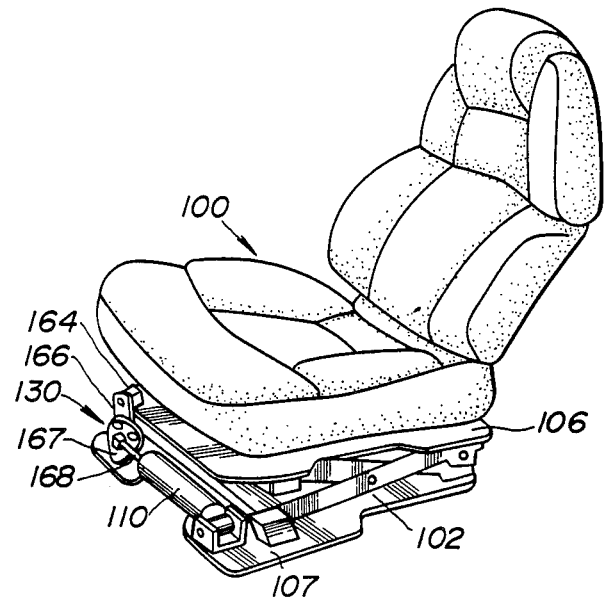
FIG. 5 is a perspective view showing a vehicle seat suspended on a suspension arrangement according to a first embodiment of the present invention.

In order to achieve a compact arrangement such as required in modern automotive vehicles, the single shock absorber strut or damper device 110 is arranged transversely with respect to the seat 100 as shown in FIG. 5 and operatively interconnected with the seat 100 via a crank mechanism 130 which translates the vertical movement of the seat 100 into telescopic or reciprocal movement of the shock absorber strut 110.

Figure 6:
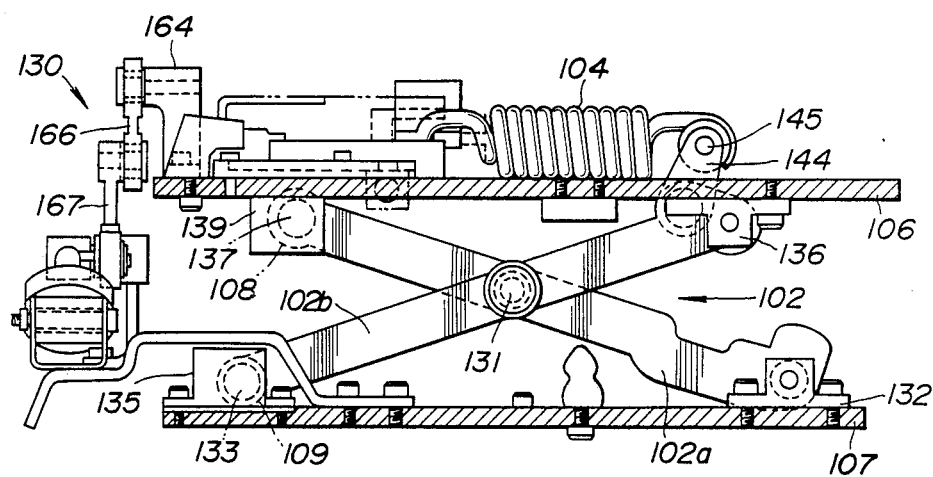
FIGS. 6 and 7 are side elevation and plan views of the suspension mechanism of the first embodiment.
Figure 7:
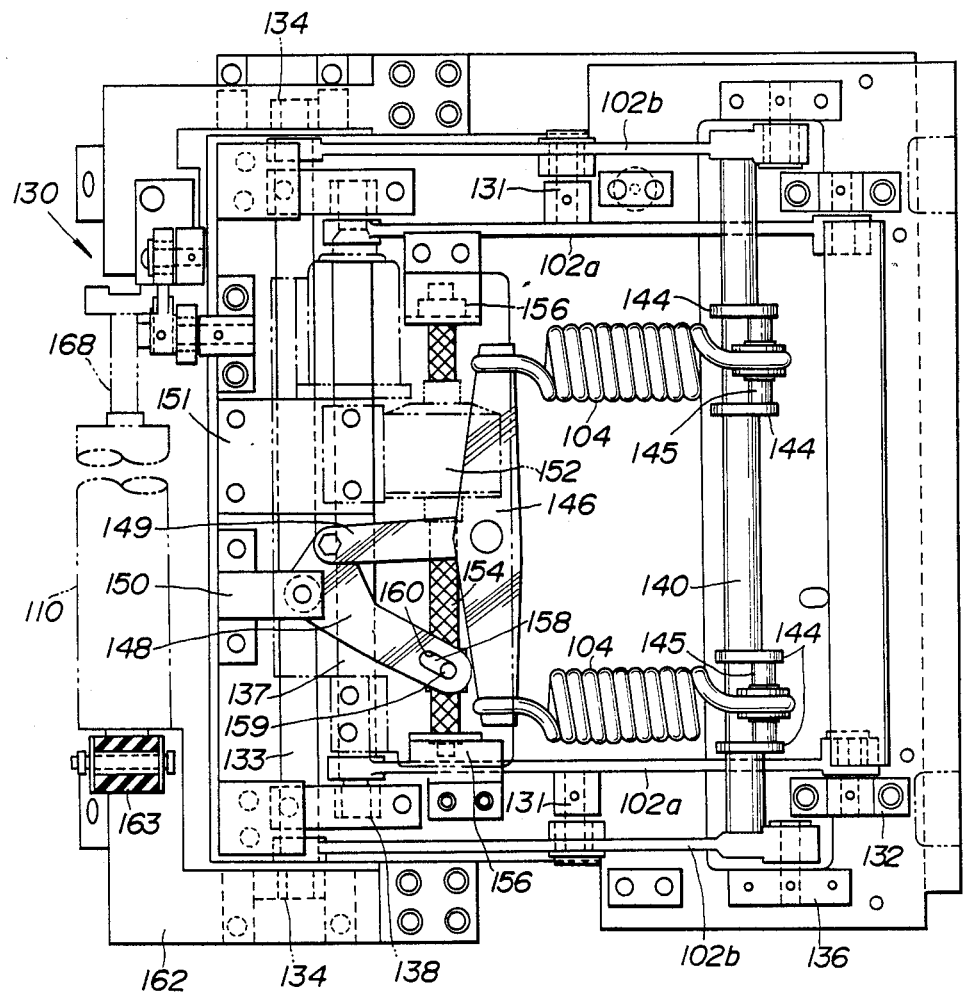

FIGS. 6 and 7 show in detail a suspension unit via which the vehicle seat is resiliently supported on the vehicle floor. This arrangement includes the previously mentioned upper base plate 106 to which the frame of the seat 100 may be detachably connected and the lower base plate 107 which can be detachably connected to the floor or chassis 100 of the vehicle. The arms of each pair of scissor levers 102 which extend between the upper and lower base plates 106, 107 are pivotally interconnected by pins 131. As best seen in FIG. 7 these pins extend through bosses (no numeral) formed on the levers.

The lower rear ends of the arms 102a are pivotally connected to the lower base plate via suitable brackets 132. The lower forward ends of the arms 102b are interconnected by a rod 133 the ends of which are provided with rollers 109. Brackets 135 are connected to the lower base plate 107 in a manner to enclose the rollers 109 and function as guides therefor.

The rear upper ends of the scissor arms 102b are pivotally connected to the upper base plate 106 by brackets 136 while the forward ends of arms 102a are pivotally connected to a transverse bar 137 the ends of the which are provided with rollers 108. Brackets 139 are fixed to the upper base plate which depend down around the rollers 108 and function as guides for the same.

A transverse rod 140 is fixedly connected to the upper ends of the arms 102b. The aft ends of relatively powerful springs 104 are connected to rod 140 through brackets 144 and pins 145. With this arrangement as the pins 145 are eccentric with respect to the axis about which the upper ends of the arms 102b are pivoted, the tension in the springs 104 acts through the brackets 144 in a manner to apply a rotational torque to levers 102b.

The forward end of the springs 104 are connected to a transverse lever 146 which in turn is connected to a bell-crank lever 148 via an intermediate lever 149.

The bell crank lever 148 is pivotally mounted on a bracket 150 fixed to forward end of the upper base plate 106. A reversible electric motor 152 is mounted on a bracket 151 which is aranged adjacent to and parallel with the bracket 150 on which the bell-crank lever 148 is mounted. A threaded drive shaft 154 is arranged to extend from either side of the motor 152 and be received in suitable bearing members 156 fixed to the sides of the upper base member 106. The drive shaft 154 is arranged to be driven in first and second rotational directions via selective energization of the motor 152.

A nut 158 threadedly received on the shaft 154 is operatively connected to the bell-crank lever 148 via a pin 159 which is received in an elongate slot 160 formed near the end of the lever.

With this arrangement rotation of the shaft 154 in a first rotational direction increases the tension in the springs 104 while rotation in a second and opposite rotation direction relieve the same. Viz., rotation which moves the nut 158 toward the motor 152 moves the bell-crank lever 148 in a manner which increases the tension while rotation in the reverse direction reduces the same.

The damper or shock absorber strut unit 110 is pivotally connected at one end to an "L" shaped bracket 162 connected to a front corner of the lower base plate. The pivotal connection is made through a vibration damping elastomeric bushing 63. The other end of the unit is operatively connected with the upper base plate 106 through a crank arrangement generally denoted by the numeral 130. This arrangement is such that as the upper base frame 106 descends toward the lower one 107 the crank arrangement 130 compresses the damper 110 and vice versa and comprises a bracket 164 fixed to the upper side of the upper base plate 106, and first and second links 166, 167 which operatively interconnect the bracket and the piston rod 168 of the shock absorber 110.

FIGS. 8 to 11 show constructional details of the shock absorber utilized in the embodiment of the present invention. As shown, this unit includes a thin tube construction which comprises an actuator tube 180 and an inner tube 182. This construction is disposed within a strut tube 184. A piston 186 is slidably received in the inner tube 182 in a manner to divide the interior of the inner tube into upper and lower chambers U/C, L/C. This piston 186 is disposed on the piston rod 168 adjacent the end thereof and formed with orifices 188, 189. These orifices are controlled by disc valves 190, 191. Threadedly received on the piston rod 168 above the piston 186 is a nut 192 and metal seat member 193. Threadedly received on the end of the piston rod below the piston is an orifice nut 194. This latter mentioned element is formed with a large diameter coaxial blind bore which is closed by a plug 195 threadedly disposed in the mouth thereof in manner to define a fixed volume valve chamber 196.

A control rod 198 is disposed through an elongate coaxial bore (no numeral) formed along the length of the piston rod 168. As shown this control rod projects out of the upper end (as seen in the drawings) of the piston rod and is operatively connected to a rack and pinion drive arrangement 200 which is operable to rotate the control rod 198 in first and second rotational directions. The lower end of the rod 198 projects into the valve chamber 196 and has a valve element 202 fixed thereto. As best seen in FIGS. 9 and 10 this valve element is formed with a plurality of small diameter through bores 203 and a downwardly depending flange portion 204 which is arranged to selectively control the communication between the valve chamber 196 formed in the orifice nut 194 and the lower chamber L/C via radial bore 206 which functions as an orifice. Communication between the upper chamber U/C and the valve chamber 196 is established by the combination of a radial bore 208 and coaxial bore 210. The latter mentioned bore 210 forms an annular passage about the lower portion of the control rod 198. To limit the amount of rotation which the valve element 202 may undergo a stopper pin 211 is arranged to project into the valve chamber 196 in a manner to be abuttable with the flange portion 204.

When the valve element 202 is rotated to the position shown in FIG. 9 the shock absorber is conditioned to permit the working fluid contained therein to be more readily transferred between the upper and lower chambers U/C, L/C than in the case said element 202 is rotated to the position shown in FIG. 10. Viz., when the valve element 202 is set to the position shown in FIG. 9 additional communication is provided between the upper and lower chambers U/C, L/C via the passage structure including elements 208, 196 and 206, whereby the shock absorber is conditioned to produce "soft" suspension characteristics. On the other hand, when valve element 202 is set in the position shown in FIG. 10 the "additional" communication is blocked and "hard" characteristics are produced.

Figure 11:
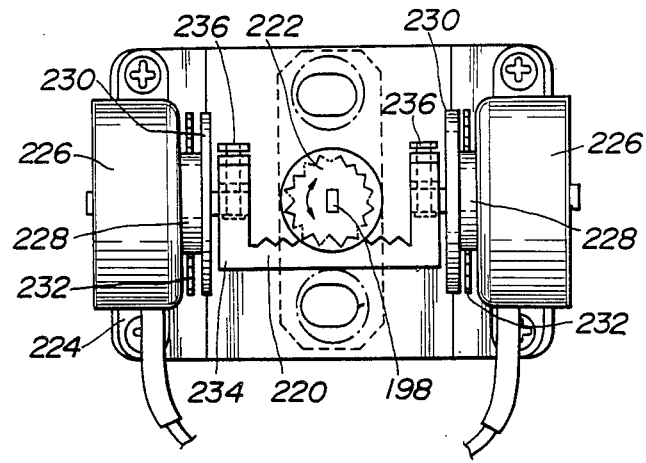
FIGS. 11 and 12 show the rack and pinion mechanism via which the valve arrangement shown in FIGS. 9 and 10 can be selectively moved between its first and second positions.
Figure 12:
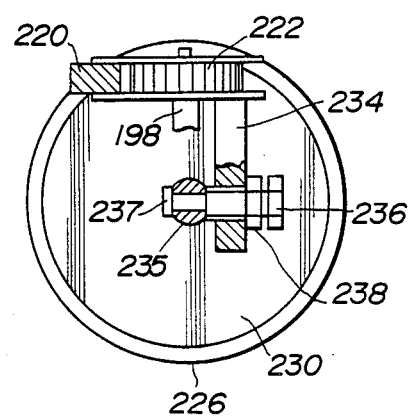

FIGS. 11 and 12 show the construction and arrangement of the rack and pinion/motor drive arrangement 200 via which the control rod 198 and valve element 202 are selectively rotatable. This arrangement basically comprises a solenoid powered linear actuator which is operative to selectively drive a rack 220 in first and second opposed directions and a pinion 222 which meshes with the rack 220 and is connected to the control rod 198 for synchronous rotation therewith.

In more detail this arrangement comprises a bracket 224 which is fixed to the upper end of the piston rod 168. This bracket 224 mounts two opposed solenoid arrangements 226. Cores 228 which are adapted to undergo axial movement only are reciprocatively disposed in the solenoids 226. A flange member 230 is formed integrally on the outboard ends (with respect to the solenoids) of the cores 228. Interposed between the flanges and the housings in which the solenoids are disposed are elastomeric shock absorbing washer-like members 232. The bracket-like member 234 on which the rack 220 is formed is connected at its end with axial projections 235 which extend from the faces of the flanges 230, via adjusting screws 236. These screws 236 are, as shown in FIG. 12, rotatably disposed through bores formed in the projections 235. Small heads 237 formed via rivetting or the like on the ends of the screws prevent the same from being removed from the bores. Male threads formed on the screws 236 cooperate with corresponding female threads formed in bores formed in downwardly extending leg portions of the bracket-like member. Lock nuts 238 are provided to secure the arrangement when the rack 220 is adjusted into suitable chatter free engagement with the teeth of the pinion 222.

Figure 13:
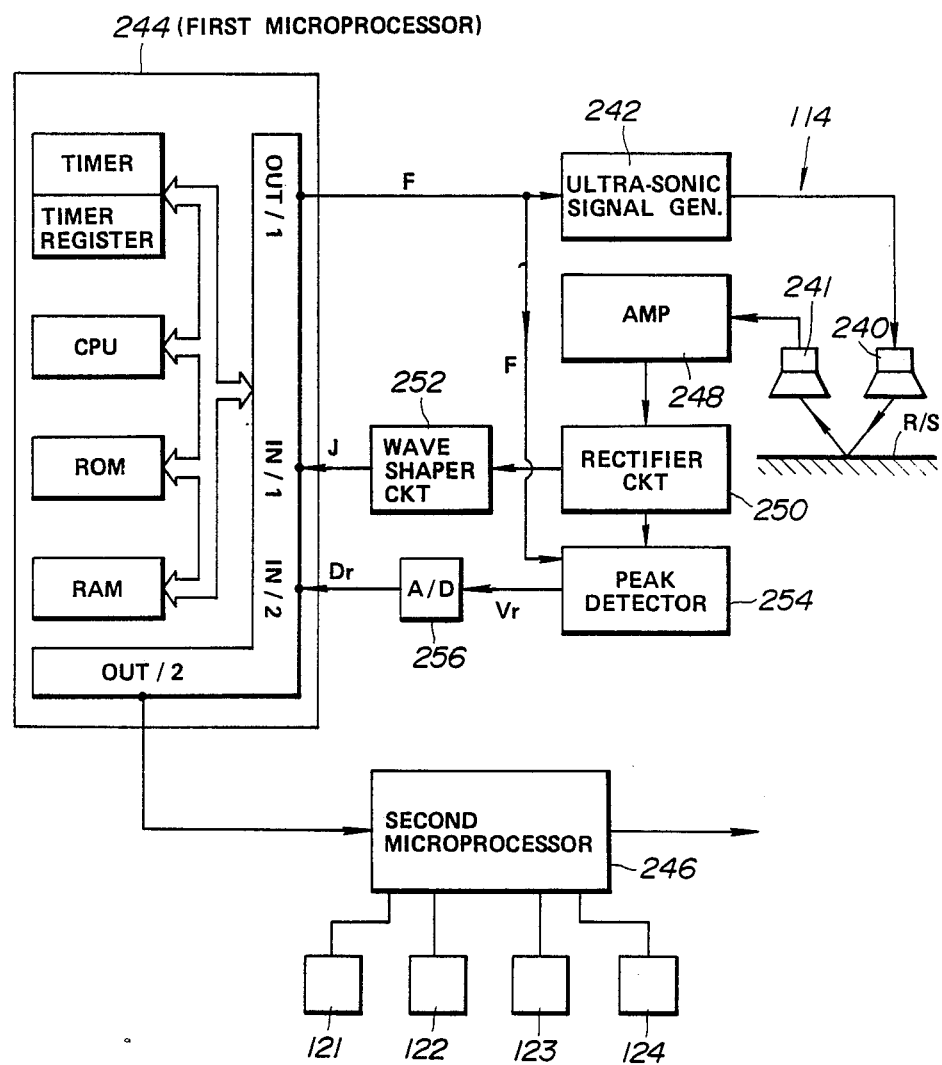
FIG. 13 shows in "black box" diagram form the control arrangement utilized in a first embodiment of the present invention.

FIG. 13 shows the circuit arrangement via which control of the first embodiment is achieved. In this embodiment the road surface condition sensor 114 takes the form of a ultrasonic surface detection arrangement wherein an untrasonic sigal emitter 240 is mounted on the underside of the vehicle and arranged to direct an untrasonic signal against the surface of the road at a predetermined angle. A pick-up 241 disposed proximate the emitter 240 is oriented in manner to receive the reflected signals.

The emitted ultrasonic signals are generated by a signal generator 242 which is responsive to a signal F issued from a port OUT/1 of the first of two microprocessors 244, 246. The received signal is fed from the pick-up to an amplifier 248 and subsequently relayed to a rectifier circuit 250. This latter mentioned circuit 250 outputs a first signal to a wave shaping circuit 252 and second siganl to a peak detection circuit 254.

The wave shaping circuit 252 inputs a first digitized signal J to the first microprocessor 244 via a first input port IN/1.

The peak detection circuit 254 also receives signal F from port OUT/1. This circuit 254 functions to determine the magnitude of the fluctuation in the received signal and output an analog signal Vr indicative of the same. This signal is A/D converted in element 256 and supplied to the first microprocessor 244 in the form of a digitized signal Dr via a second input port IN/2.

FIG. 15 shows in flow chart form the characterizing steps of a "soft clock" interrupt program which is performed in the first microprocessor 244 in order to generate the ultrasonic signal generator control signal F. This program is run at highly frequent predetermined time intervals in order to control the interval between ultrasonic signal emissions and thus ensure an accurate determination of the road surface being traversed by the vehicle in which the seat suspension according to the present invention is applied.

As shown, at step 1001 the output of a timer circuit included in the first microprocessor is read and the instant time value $t_i$ set into the register of the timer. At step 1002 a predetermined time period which corresponds to the desired pulse width $T_1$ of the ultrasonic signal is set into the register. Subsequently, at step 1003 the instant time value is compared with that of the pulse width. In the event that $t_i$ is still less than $T_1$ then at step 1004 a command to set OUT/1 to ON is issued and the program returns. However, in the event that $t_i$ equals $T_1$ then at step 1005 the emission of the signal is stopped by setting OUT/1 to OFF.

At steps 1006 and 1007 the program watches the time and causes OUT/1 to remain OFF until the expiration of a period the eqivalent of time T2. At step 1008 a command to set OUT/1 to ON is issued and $t_i$ reset to zero. This of course produces the leading edge of signal F and resets the process which will maintain OUT/1 ON for a time $T_1$.

Figure 16:
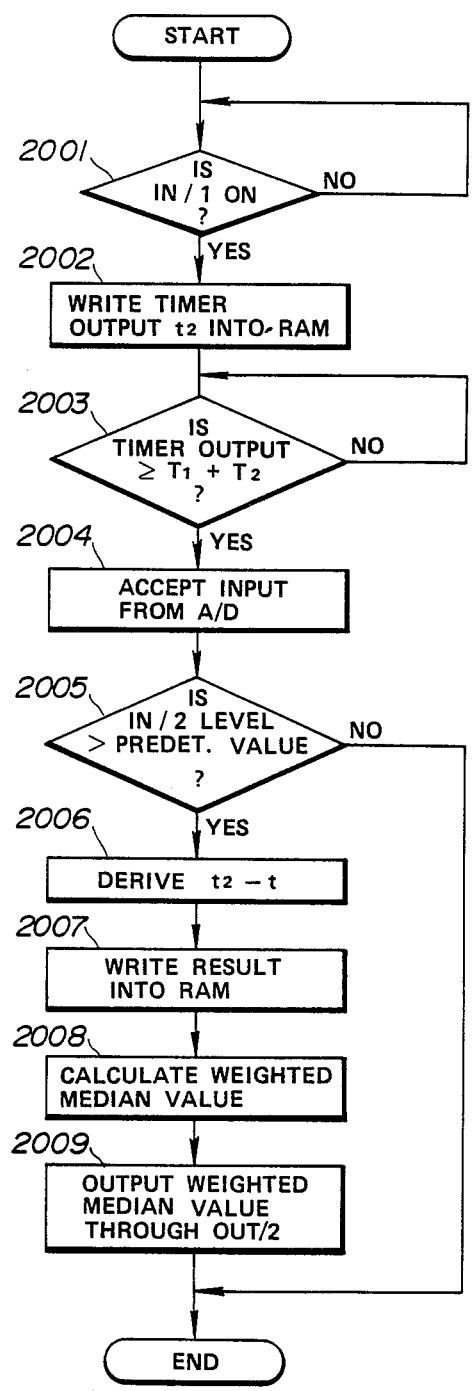

FIG. 16 shows the steps undertaken (in the first microprocessor 244) in order to derive what shall be referred to as "distance data M" which is used to distinguish between rough and smooth road surfaces.

Figure 14:
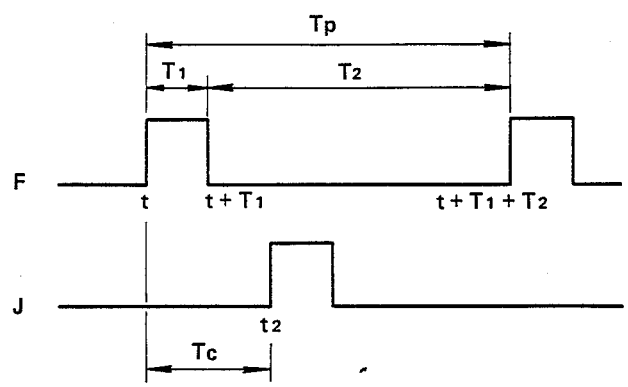
FIG. 14 is a timing chart showing wave forms which correspond to the ultrasonic signals issued and received by the road surface condition detection sensor utilized in the first embodiment of the present invention.

The first step of this program is to sample the output of OUT/1 and determine if OUT/1 is ON or OFF. In the event that OUT/1 is OFF, the program recycles. Upon an ON status being identified, the program records the time $t_2$ which corresponds to the leading edge of the received signal pulse form (see signal J FIG. 14). At step 2003 the output of the timer circuit is sampled to determine if the count thereof has reached a value which corresponds to $T_1 + T_2$. Until this value is reached the program recycles. At step 2004 a command to permit input of signal Dr from the A/D converter via port IN/2 is issued.

At step 2005 the magnitude of signal Dr is compared with a predetermined value. If the level of Dr is below this value then the program returns while in the event that a higher Dr value is detected then at step 2006 time $T_c$ (see FIG. 14) is determined by ascertaining the difference between t and $t_2$. This difference stored in RAM and at step 2008 a weighted median of a plurality of difference data is determined. This determination is carried out by taking a given number (n) of data, arranging the same in order of magnitude from small to large and selecting the value which is found in the middle thereof. At step 2009 the value of weighed median is outputted via port OUT/2 to the second microprocessor 246.

As the mathematical processes via which the above mentioned may be derived, for example the rounding off of non-whole number integer values and the like, are well known to those in the art of mathematics and computer programming no further explanation is deemed necessary.

FIG. 17 shows a flow chart which depicts the steps which are carried out in the second microprocessor 246 in order to determine whether the valve of the shock aborber should be set to hard or to soft.

As shown, in steps 3001 to 3004 data M fed to the second microprocessor 246 from the first one 244 is stored in RAM, stacked, averaged and the absolute deviation $\Delta M$ derived.

In connection with the above according to the instant program the newest n data are stored and the older values disregarded. The average value $\overline{M}$ is derives using the following equation $$\overline{M} = \Sigma M_i/(n+1) \ldots \quad (1)$$

Following this determination the following equation is used to determine the above mentioned absolute devation $$\Delta M = \Sigma |M_i - \overline{M}| \ldots \quad (2)$$

At step 3005 the value of $\Delta M$ is compared with a predetermined minimum $\Delta M min$ value. In the event that the instant absolute deviation is equal to or greater than the minimum permissible value it is assumed that the vehicle is traversing a road having a rough surface and at step 3006 a command is issued to generate a rough road signal. On the other hand, if the absolute deviation value is less than $\Delta M nin$ then a command to stop the rough road signal from being generated is issued.

Figure 19:
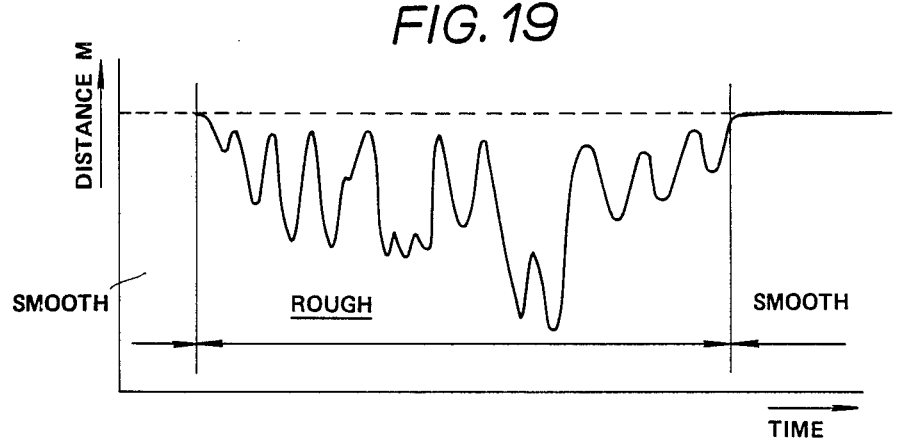
FIG. 19 shows in terms of time and output level of the road surface detection arrangement, the wave forms which depict rough and smooth road surfaces.

FIG. 19 shows, in terms of the sensed distance and time, a trace wherein the first and last sections denote smooth road conditions and the intermediate section denotes rough road conditions. As will be appreciated during passage over a smooth road surface the distance detected by the ultrasonic sensor 114 has a constantly high value while when traversing a rough surface the detected distance fluctuates markedly. Thus, while the difference between distance readings remains small it can be assumed that the surface is smooth while in the event that large changes in the distance data occur it can be assumed that the vehicle is traversing a road having a rough surface. Under the latter conditions it is preferable from the point of safety and sense of stability of the seat occupant to harden the seat suspension and thus obviate the tendency for the passenger to undergo disturbing vertical movement within the vehicle.

Figure 18:
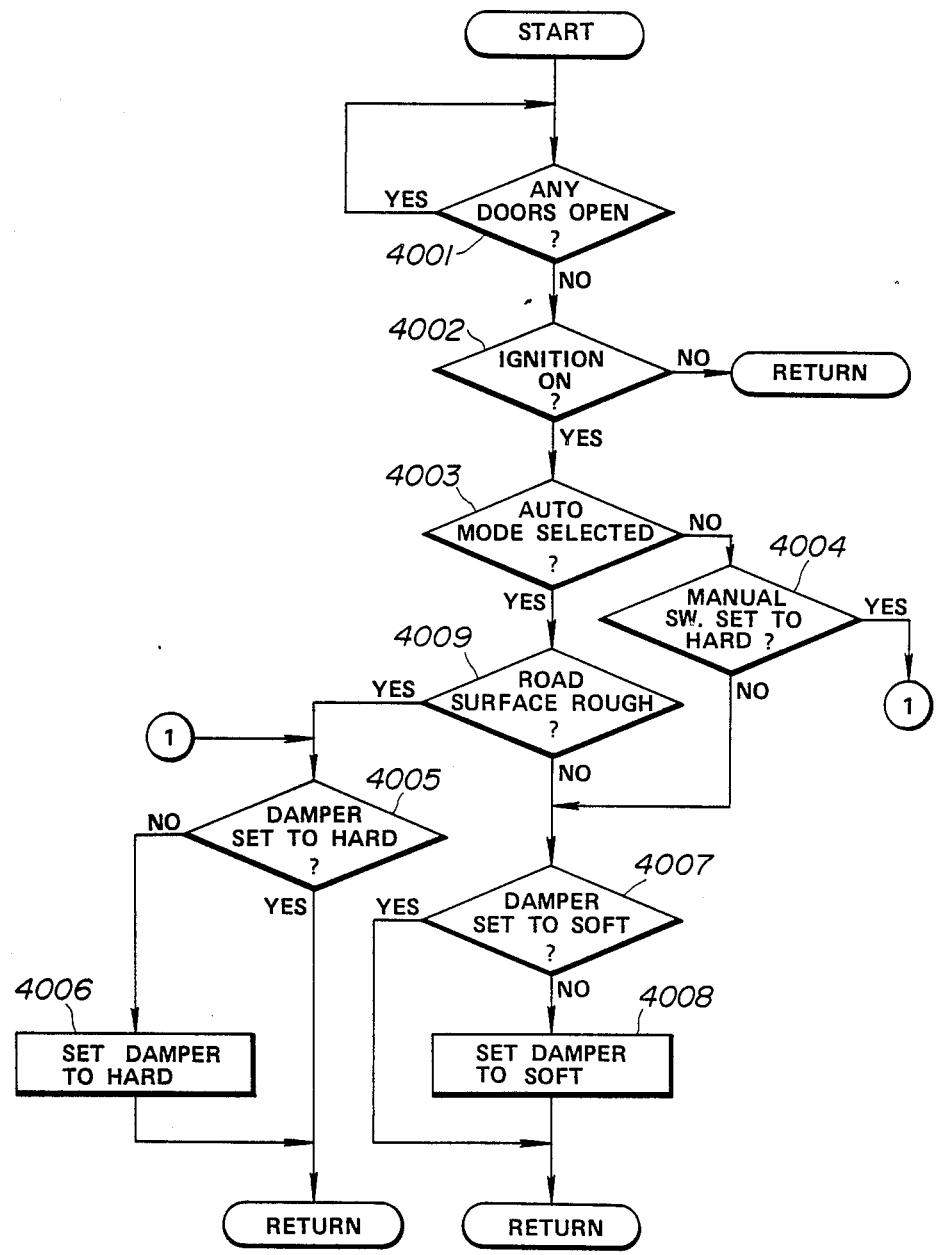
Figure 21:
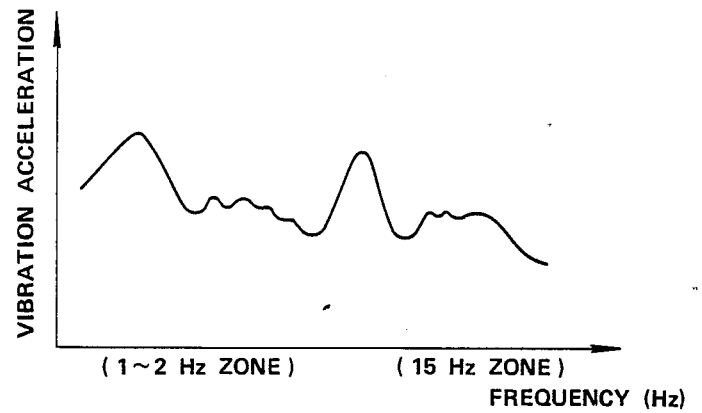
FIG. 21 is a graph which shows in terms of vibrational acceleration and frequency, the vibrational zones in which the second embodiment of the present invention influences a stabilizing effect.

FIG. 18 is a flow chart showing a control program which is executed by the second microprocessor 246 and which utilizes the data derived in the above mentioned programs.

The first step of this program is to sample the output of the door switch or switches 121 of the vehicle and determine if a door or doors are open. In the event that at least one door is open then the program recycles. Upon all of the doors being sensed as being closed the program flows to step 4002 wherein the instant status of the engine ignition switch 122 is determined. If the switch is open (viz., OFF) then the program returns. However, if the switch is ON then at step 4003 the status of seat suspension control switch 124 is sampled. This switch is arranged have an automatic setting wherein automatic hard/soft control is permitted, a manual soft and a manual hard position. The latter mentioned settings of course permit the driver, for example, to manually set the seat suspension to "hard" if a firmer ride under all conditions is preferred. Thus, in the event that the control switch is not set to the automatic position then at step 4004 it is determined if the switch 124 has been manually set to hard. In the event that the control switch 124 is so set then the program flows to step 4005 wherein the instant status of the shock absorber control valve is determined. If not set to hard then at step 4006 a command to induce this setting is issued. On the other hand, if the control switch 124 is set to soft then the program flows to step 4007 wherein the status of the control valve is sampled. In the event that this enquiry reveals that the value 202 is set to hard then a command to reverse the situation is issued in step 4008.

However, if the automatic mode has been selected at step 4003 then at step 4009 it is determined if the rough road signal is on or not (see steps 3005 to 3007 in FIG. 17). If the rough road signal is being issued then the program flows to step 4005. If the signal is absent then the program goes to step 4007.

Figure 20:
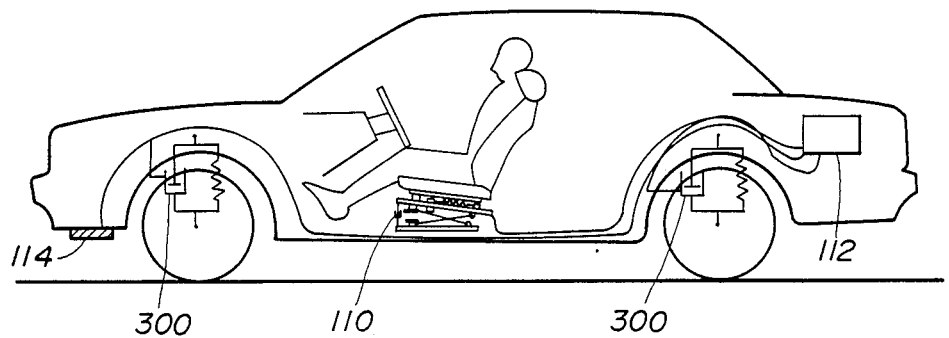
FIG. 20 shows a vehicle equipped with a second embodiment of the present invention wherein control of the vehicle suspension as well as the seat arrangement is controlled in response to the detection of rough/smooth road surfaces.

FIG. 20 shows a second embodiment of the present invention. In this arrangement, the vehicle suspension shock absorbers 300 as well as those of the seat suspension(s) are controlled in accordance with condition of the road surface.

In this embodiment, since the vehicle suspension, as well as that applied to the seat(s), is controlled in accordance with the condition of the road surface. a highly satisfactory ride is experienced by the seat occupants. A notable effect can be achieved in the 1-2 Hz and the 15 Hz vibration zones.

Figure 22:
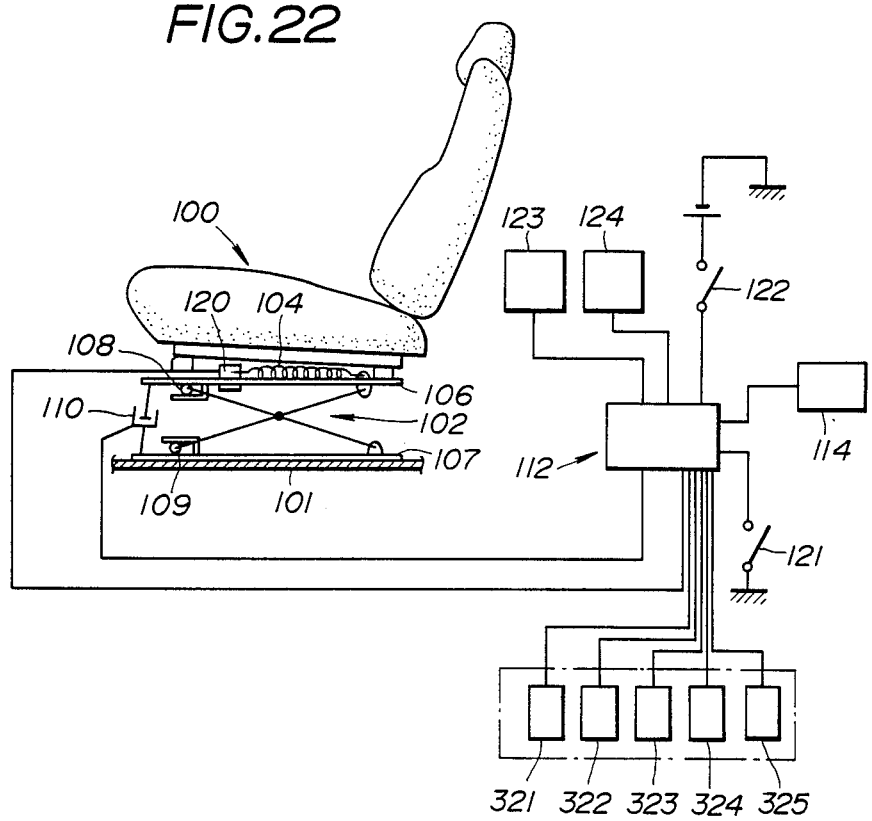
FIG. 22 shows in schematic elevation a third embodiment of the present invention which features a plurality of vehicle operational mode detection sensors.
Figure 23:
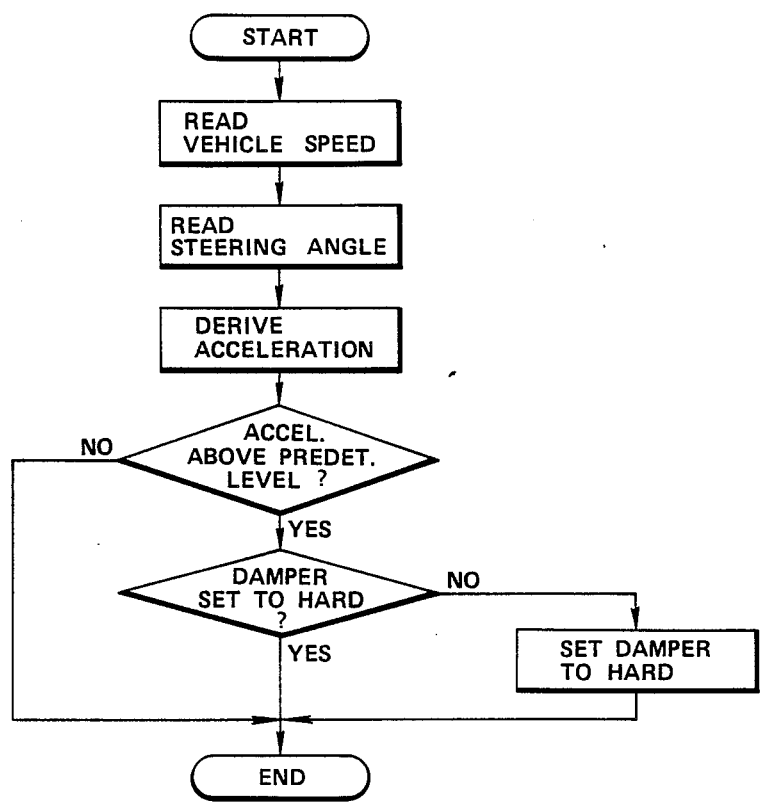
FIGS. 23 to 26 are flow charts showing the steps which characterize the operation of the third embodiment.
Figure 24:
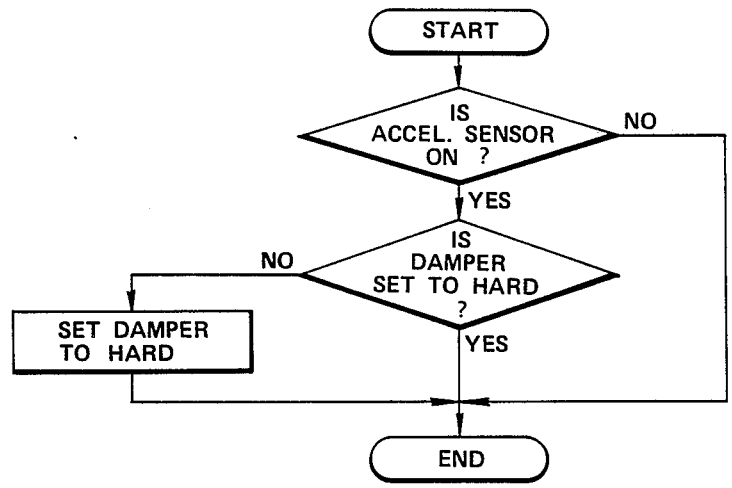
Figure 25:
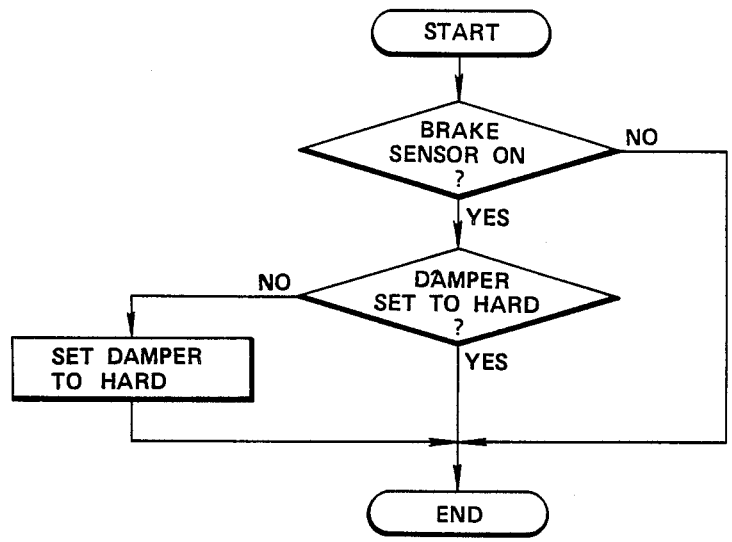
Figure 26:
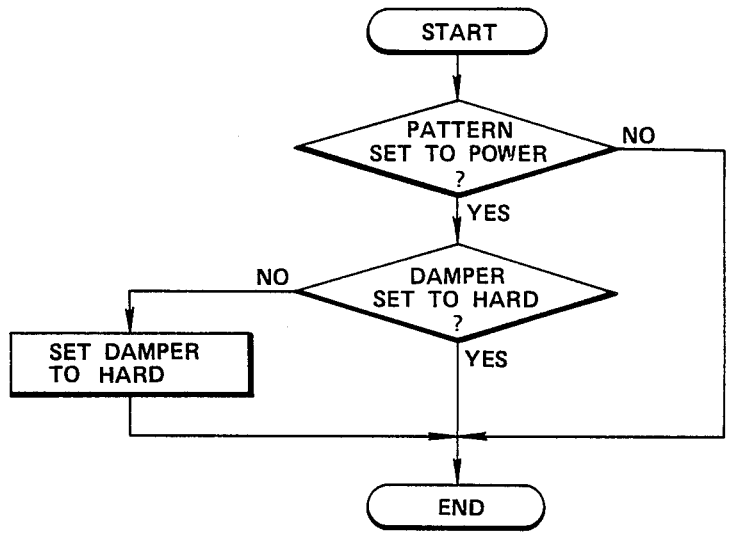

FIG. 22 shows a third embodiment of the present invention. This embodiment is essentially the same as the first one and differs in that a plurality of additional vehicle operational mode sensors are provided and the data derived from these used to control the setting of the damper valve in addition to the output of the road surface detection sensor 114. These sensors take the form of a steering angle sensor 321, a vehicle speed sensor 322, a deceleration or G sensor 323, a brake sensor 324 and a transmission pattern selection sensor 325. The outputs of these sensors are suitably applied to the second microprocessor, via A/D converters in the event that the sensor in question outputs an analog signal.

With the above sensors it is possible, for example, to approximate the acceleration forces which are being applied to the seat occupant using the data derived from the steering angle sensor and the vehicle speed sensor. With the third embodiment it is possible to harden the seat when the acceleration (lateral for example) exceeds a predetermined limit. The same applies for high speed running, braking etc. In the event that the vehicle to which the present invention is applied is equipped with an automatic transmission wherein the shift pattern can be manually changed from one adapted to induce fuel economical shifting to one adapted to produce power and good acceleration, it is within the scope of the third embodiment to determine which mode is selected (using pattern sensor 325— a switch is closed when the transmission control is manually set to the power shift pattern) and in the event that the power mode has been selected set the seat suspension to "hard".

The brake sensor 324 may take the form of a simple switch which is arranged to be closed when a brake pedal of the vehicle is depressed beyond a predetermined amount, while the G sensor 323 may take the form of the device shown in FIG. 29 which will described hereinafter.

The vehicle steering angle sensor 321 may take the form of a device whcih detects the amount of rotation of the steering wheel from a neutral or home position and outputs a suitable signal indicative of the amount of rotation and therefore the amount of steering.

FIGS. 23 to 26 show, in flow chart form, examples of programs which can run in the second microprocessor 246 (see FIG. 13). These programs can be run at frequent predetermined intervals in the form of interrupt programs. It is within the scope of the present invention to run the programs shown in FIGS. 23 to 25 more frequently than that shown in FIG. 26 if so desired. Viz., it will be appreciated that the likelihood of the shift pattern being changed with any frequency is low whereas the application of the vehicle brakes steering, etc., should be closely monitored. As the nature of the control derived from each of the above mentioned programs is self-evident from the flow charts no written disclosure of the same will be given.

Figure 27:
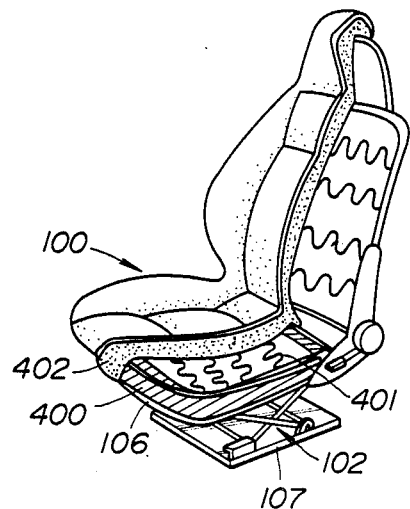
FIGS. 27 and 28 show possible seat constructions which can be used in conjunction with the seat suspension arrangements of the various embodiments of the present invention.
Figure 28:
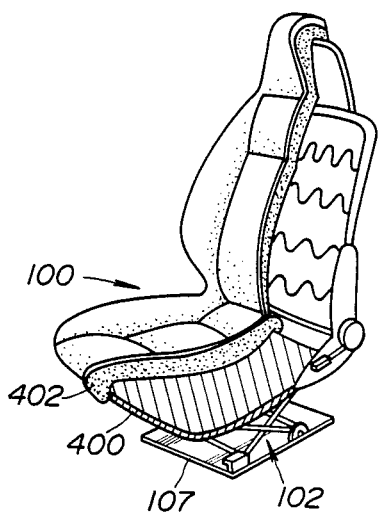

FIGS. 27 and 28 show seat constructions which can be utilized with the various embodiments of the present invention. The construction shown in FIG. 27 is such that the cushion or seat section as distinct from the backrest portion comprises a frame pan 400, serpentine springs 401, and a padding 402 which is supported on the springs 401. On the other hand, the seat construction shown in FIG. 28 is such that the serpentine shaped springs are omitted and the padding disposed directly on the frame pan. This construction takes full advantage of provision of spring 104 and utilizes the same to provide the "springy feel" normally imparted to the seat occupant by the serpentine springs 401 shown in FIG. 27. This arrangement allows the pan to be carefully contoured in a manner that as the padding is directly thereon a highly desirable form can be produced whereby the occupant can be firmly supported in a manner which exhibits excellent fatigue resisting characteristics. With this construction when the shock absorber is set to its "hard" condition the padding provides the required springy feeling.

Further merits derived from the FIG. 28 construction come in the form of a highly compact and lightweight seat arrangement which help compensate for the weight penalties incurred by the provision of the suspension unit thereunder.

Figure 29:
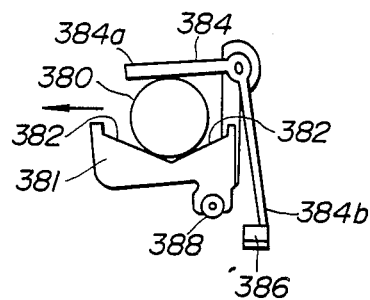
FIG. 29 shows an example of an acceleration sensor which can be used in connection with the third embodiment of the present invention.

FIG. 29 shows an example of an acceleration sensor which can be used in the third embodiment of the present invention. This sensor takes the form of an inertia mass 380 such as a metal ball or roller which is received in holder 381 formed with a V-shaped recess. The sides of the recess act as ramps 382 along which the inertia mass can roll when subject to sufficient acceleration. In this arrangement an essentially L-shaped arm 384 is pivotally mounted so that one leg 384a thereof engages the top of the inertia mass while the other leg 384b is provided with a permanent magnet 386. A suitable proximity switch 388 is located on the holder 381 in which the V-shaped recess is formed in a manner that when the interia mass 380 rolls up either of the ramps 382 the lever 384 is pivoted and moves a permanent magnetic 386 sufficiently close to the proximity switch 388 to induce an output therefrom. The proximity switch may take the form of a Hall-effect switch or the like.

If desired a plurality of such G sensors can be provided and oriented in different directions. For example one can be arranged so that the ramps are oriented laterally across the vehicle thus enabling lateral acceleration effects to be readily detected.

Figure 30:
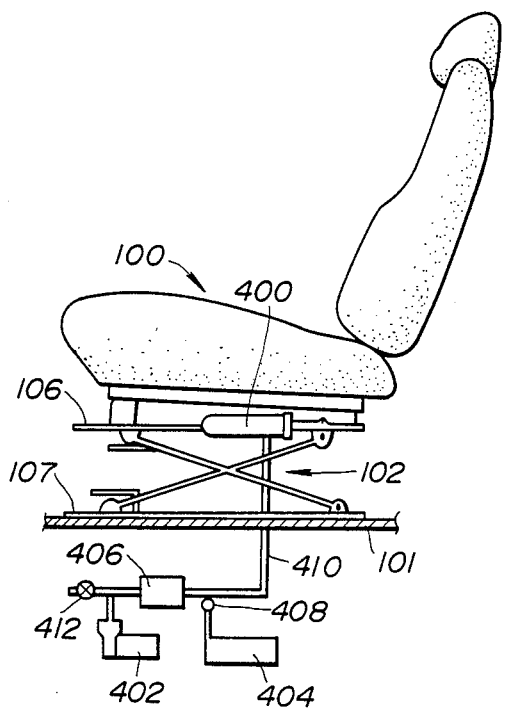
FIG. 30 shows a fourth embodiment of the present invention wherein a hydraulic actuated arrangement is used to control the suspension characteristics of the vehicle seat.

FIG. 30 shows a fourth embodiment of the present invention. In this embodiment the springs 104 and shock absorber 110 are replaced with one or more air springs 400. These springs are supplied air under pressure from a control arrangement which includes an air pump 402, an accumulator 404, a pressure control valve 406, an ON/OFF type valve 408 interposed between the air line 410 leading to the air spring(s) and the accumulator 404, and a ON/OFF type vent valve 412 via which pressure from the pump 402 and the pressure control valve 406 can be released to the ambient atmosphere.

With this arrangement the function provided in the previous embodiments by connecting the shock absorber 110 between a structural element of the seat suspension and the floor or chassis 101 of the vehicle and switching vlave element 202 to the hard and soft control positions thereof, is more simply achieved by varying the level of the air pressure fed to the air springs and by cutting off communication between the air spring(s) and the accumulator 404 by closing valve 408. Under the latter circumstances the amount of air which can be forced out of the air springs 400 is highly limited and this induces "hard" suspension characteristics. When valve 408 is open a relatively large amount of air can be transferred from the spring(s) 400 into the accumulator 404 when the former undergo compression. This of course provides the "soft" setting. Be increasing the total pressure in the system the height of the seat can be regulated.

As will be understood with the fourth embodiment instead of modifying the effect of springs via the provision of a separate element (i.e. shock absorber 110) the spring characteristics are directly controlled.

What is claimed is:
1. In a road vehicle
a chassis;
a seat; and
a seat control system comprising:
  a first sensor for sensing the condition of the road on which the vehicle is running and for issuing a signal indicative of whether the surface of a road is smooth or rough, said sensor being mounted on said chassis and discrete from said seat;
  a suspension operatively interconnecting said seat and said chassis, said suspension including:
  structural members;
  means for varying the resiliency of the suspension in respopnse to the signal issued by said first sensor; and
  means for varying a bias applied to said structural members in response to a manually generated signal to vary the height of said seat above said chassis.
2. The combination claimed in claim 1 further comprising:
  a control circuit, said control circuit being operatively interposed between said resiliency varying means and said first sensor and responsive to said first sensor; and wherein said vehicle includes:
  a vehicle suspension arrangement operatively connected to each of the road wheels thereof, each vehicle suspension arrangement including a damper device which can be set to produce hard suspension characteristics and soft suspension characteristics, said damper device being operatively connected with said control circuit in a manner to be controlled in response to said first sensor.
3. The combination claimed in claim 1 further comprising:
  a second sensor for sensing a vehicle operational parameter which varies with the amount of acceleration applied to said seat; and
  a control circuit responsive to said first and second sensors, said control circuit being operatively interposed between said resiliency varying means and said first and second sensors.
4. The combination claimed in claim 1 wherein said bias varying means comprises:
  a spring arranged to apply a bias to said structural members of said suspension in a manner which controls the height at which said suspension supports said seat above said chassis; and
  wherein said resiliency verying means comprises:
  a single damper device operatively interconnected between said seat and said chassis, said damper including:
  a control valve having a first position wherein said damper exhibits soft damping characteristics and a second position wherein said damper exhibits hard damping characteristics, and
  a servo for selectively moving said value to said first and second positions, said servo being responsive to said first sensor for moving said value to said first position in response to said sensor issuing a signal indicative of a smooth road surface and to said second position in response to said sensor issuing a signal indicative of a rough surface.
5. The combination claimed in claim 4 further comprising:
  a motor operatively connected to said spring, said motor being selectively energizable in a manner to vary the tension in said spring in a manner to vary the bias applied to said structural members of said suspension and thus vary the height at which said seat is supported above said chassis.
6. The combination claimed in claim 1 wherein said resiliency varying means and said bias varying means are combined into a single piece of apparatus which comprises:
  a fluid spring operatively connected with said structural members of said suspension;
  a source of fluid under pressure;
  an accumulator in fluid communication with said fluid spring and said source;
  a first valve interposed between said fluid spring and said accumulator, said first valve being responsive to the output of said sensor for permitting fluid communication between said fluid spring and said accumulator in response to said sensor outputting a signal indicative of a smooth road surface and for cutting the communication off when said sensor outputs a signal indicative of a rough road surface.
7. The combination claimed in claim 6 wherein said apparatus further includes:
  a pressure control valve which controls the pressure prevailing in said fluid spring and said accumulator, said pressure control valve being disposed between said source of fluid under pressure and said accumulator; and
  a vent valve for relieving excess pressure produced by said source;

said pressure control valve and said vent valve operable in a manner which enables the height of said seat to be selectively adjusted.

8. In a road vehicle
a chassis;
a structural member located above said chassis;
a road condition sensor for sensing the condition of a road on which the vehicle is running and for issuing a signal indicative of whether the surface of said road is smooth or rough, said sensor being operatively mounted on said chassis;
a suspension for suspending said structural member above said chassis, said suspension including:
a linkage operatively interconnecting said structural member and said chassis, said linkage including first and second pivotally interconnected elongate members, the first elongate member having a first end pivotally connected to said chassis and a second end in sliding engagement with said structural member, said second elongate member having a first end pivotally connected to said structural member and a second end in sliding engagement with said chassis, said linkage having a scissor-like configuration which lies in a first plane;
a damper connected at one end to said chassis and at the other end to said structural member, said damper being arranged to lie in a second plane, said second plane intersecting said first plane, said damper including a valve which permits the damper to be adjusted to produce at least two different damping characteristics, said valve being operatively connected to and responsive to said sensor;
a motor mounted on said structural member;
a lever arrangement operatively connected with said motor; and
a spring operatively interconnected between said lever arrangement and said linkage, said motor being selectively operable to control the tension in said spring and therefore control the height at which said structural member is suspended above said chassis.

9. The combination claimed in claim 8 further comprising a vehicle suspension system, said vehicle suspension system including damper means which is responsive to said road condition sensor.

10. In a road vehicle
a chassis;
a structural member located above said chassis;
a road condition sensor for sensing the condition of a road on which the vehicle is running and for issuing a signal indicative of whether the surface of said road is smooth or rough, said sensor being operatively mounted on said chassis;
a suspension for suspending said structural member above said chassis, said suspension including:
a linkage operatively interconnecting said structural member and said chassis, said linkage including first and second pivotally interconnected elongate members, the first elongate member having a first end pivotally connected to said chassis and a second end in sliding engagement with said structural member, said second elongate member having a first end pivotally connected to said structural member and a second end in sliding engagement with said chassis, said linkage having a scissor-like configuration;
a fluid spring operatively interconnected between said structural member and said second elongate structural member of said linkage;
a source of fluid under pressure;
an accumulator in fluid communication with said fluid spring and said source;
a communication control valve interposed between said fluid spring and said accumulator, said communication control valve being responsive to the output of said sensor for permitting fluid communication between said fluid spring and said accumulator in response to said sensor outputting a signal indicative of a smooth road surface and for cutting the communication off when said sensor outputs a signal indicative of a rough road surface;
a pressure control valve which controls the pressure prevailing in said fluid spring and said accumulator, said pressure control valve being disposed between said source of fluid under pressure and said accumulator; and
control means for selectively controlling said pressure control valve to vary the pressure in the fluid spring to selectively adjust the height of the structural member.

11. The combination claimed in claim 10 further comprising a vehicle suspension system said vehicle suspension system including damper means which is responsive to said road condition sensor.

12. In an automotive vehicle having a chassis
a suspension system comprising:
a suspension means for suspending the chassis on a plurality of road wheels, said suspension means including first variable damper units which can be selectively adjusted to produce soft and hard damping characteristics;
a seat;
a seat suspension for suspending said seat on said vehicle chassis, said vehicle seat including a second variable damper unit which can be selectively adjusted to provide hard and soft damping characteristics;
a road condition sensor, said road condition sensor being mounted on said chassis and arranged to detect the condition of the road surface and;
a control circuit responsive to said road condition sensor, said control circuit being operatively connected with said first and second damper units in a manner to adjust the same to produce hard damping characteristics when the road surface is indicated as being rough and soft damping characteristics when the road surface is indicated as being smooth.

13. The combination claimed in claim 12 wherein said seat suspension comprises:
first and second linkage operatively interconnecting said seat with said chassis, each of said first and second linkage including:
first and second elongate members, said first and second elongate members being pivotally interconnected, said first elongate member having a first end pivotally connected to said chassis and a second end in sliding contact wiht a structural member of said seat, said second elongate member having a first end pivotally connected to said structural member of said seat and a second end in sliding contact with said chassis;

said first and second linkages each having a scissor-like configuration and lying in a first plane and a second plane, respectively;

said second damper unit being arranged with respect to said seat and said first and second linkages in such a manner as to lie in a third plane which intersects at least one of said first and second planes.

14. The combination claimed in claim 12 wherein said seat suspension comprises:

first and second linkages operatively interconnecting said seat with said chassis, each of said first and second linkages including:

first and second elongate members, said first and second elongate members being pivotally interconnected, said first elongate member having a first end pivotally connected to said chassis and a second end in sliding contact with a structural member of said seat, said second elongate member having a first end pivotally connected to said structural member of said seat and a second end in sliding contact with said chassis;

said first and second linkages each having a scissor-like configuration and lying in a first plane and a second plane, respectively;

said second damper unit comprising:

a fluid spring connected between said seat and one of said first and second linkages;

a source of fluid under pressure;

an accumulator in fluid communication with said fluid spring and said source;

a communication control valve interposed between said fluid spring and said accumulator, said communication control valve being responsive to the output of said sensor for permitting fluid communication between said fluid spring and said accumulator in response to said sensor outputting a signal indicative of a smooth road surface and for cutting the communication off when said sensor outputs a signal indicative of a rough road surface;

a pressure control valve which controls the pressure in said fluid spring and said assumulator, said pressure control valve being disposed between said source of fluid under pressure and said accumulator; and control means for selectively controlling said pressure control valve to vary the pressure in the fluid spring to selectively adjust the height of the seat.

* * * * *

UNITED STATES PATENT AND TRADEMARK OFFICE
CERTIFICATE OF CORRECTION

PATENT NO. : 4,913,482

DATED : April 3, 1990

INVENTOR(S) : Hanai et al

It is certified that error appears in the above-identified patent and that said Letters Patent is hereby corrected as shown below:

On the title page, in item [73] Assignee:, "Mitsubishi Denki Kabushiki Kaisha" should be --Nissan Motor Co., Ltd.--.

Column 11, line 51, change "respopnse" to --response--;
Column 14, line 44, change "and;" to --; and--;
         line 55, change "linkage" to --linkages--;
         line 57, change "linkage" to --linkages--;
         line 62, change "wiht" to --with--.

Signed and Sealed this

Fifteenth Day of October, 1991

*Attest:*

HARRY F. MANBECK, JR.

*Attesting Officer*      *Commissioner of Patents and Trademarks*